UNITED STATES PATENT OFFICE.

HEINRICH AUGUST BERNTHSEN, OF MANNHEIM, GERMANY, ASSIGNOR TO THE BADISCHE ANILIN AND SODA FABRIK, OF LUDWIGSHAFEN, GERMANY.

ACID RHODAMIN DYE AND PROCESS OF MAKING SAME.

SPECIFICATION forming part of Letters Patent No. 646,794, dated April 3, 1900.

Application filed December 16, 1897. Serial No. 662,180. (Specimens.)

*To all whom it may concern:*

Be it known that I, HEINRICH AUGUST BERNTHSEN, doctor of philosophy, a subject of the King of Prussia, Emperor of Germany, residing at Mannheim, in the Grand Duchy of Baden and Empire of Germany, have invented new and useful Improvements in the Manufacture of Coloring-Matters Related to the Rhodamin Series, (for which patents were obtained in Germany December 8, 1893, No. 81,958; in England December 20, 1893, No. 24,543, and in France January 20, 1894, No. 235,672,) of which the following is a specification.

If the rhodamins derived from dibasic acids (phthalic, succinic acid) be treated with anilin or other primary aromatic amins, bodies which appear to be phenyl-imids (tolyl-imids and the like) are obtained. These bodies, which result from tetra-methyl or ethyl phthalic rhodamin, tetra-methyl or ethyl succinic rhodamin, diethyl phthalic rhodamin diortho, or dipara-tolyl-phthalic rhodamin are colorless products, insoluble in water, which yield weakly-colored solutions in acetic acid. Now I have found that by sulfonation these products can be converted into valuable acid dyes which give as bright shades on animal fiber on dyeing in the acid-bath as do the rhodamins themselves and possess the further valuable characteristic of dyeing darker shades than can be obtained with the basic rhodamins.

The following examples will serve to illustrate the manner in which my invention can best be carried into practical effect. The parts are by weight:

Example 1: Dissolve one (1) part of the "rhodamin-phenyl-imid," obtained by heating together one (1) part of tetra-ethyl-phthalic rhodamin or its base and three (3) parts of anilin for about four (4) hours, in about five (5) parts of sulfuric acid monohydrate (one hundred per cent. $H_2SO_4$) and add from time to time small quantities of fuming sulfuric acid containing about twenty-three per cent. (23%) free anhydrid ($SO_3$) while heating on the boiling-water bath. Continue this treatment until a test portion dissolves completely in hot dilute soda solution. Then pour into water, filter off the separated sulfoacid, and convert it into sodium salt. This salt dissolves with difficulty in cold water, but it is more soluble in hot water.

Example 2: Add while stirring thoroughly one (1) part of the rhodamin-phenyl-imid (obtainable, as described, in the foregoing example) to about four (4) parts of fuming sulfuric acid containing about twenty-three per cent. (23%) free anhydrid, ($SO_3$.) Heat the mixture on the water-bath for about an hour and a half (1½) or until the resulting sulfoacid gives a sodium salt which is readily formed separates out in part. A further quansoluble even in cold water. Allow to cool and pour the melt onto ice. The sulfoacid tity can be precipitated with common salt. Collect and convert into sodium salt. This salt is a red powder readily soluble in water, giving a bluish-red solution with a yellowish-red fluorescence. Dilute solutions lose their color on addition of an alkali—such as caustic soda, soda, or ammonia. The free sulfoacid is readily soluble in hot water and also soluble without difficulty in the cold.

This new dye yields beautiful red and fluorescent shades on wool, the dark shades being especially brilliant. The dye is characterized by a valuable degree of fastness against the action of light.

The analogues of the rhodamin-phenylimid obtainable by using the homologues of anilin and analogues and derivatives thereof can also be sulfonated to yield valuable acid dyes. In all cases various conditions of sulfonation can be observed, and different sulfoacids or mixtures of sulfoacids are obtained accordingly. Speaking generally, the higher sulfonated bodies are more pronounced dyes, besides possessing greater solubility.

The sulfonation products, which are obtained by the treatment of the aforementioned imids with fuming sulfuric acid, are characterized by yielding the corresponding basic rhodamin if they be subjected to long (*e. g.*, five hours) boiling in the presence of sulfuric acid containing twenty per cent. $H_2SO_4$.

What I claim as new, and desire to secure by Letters Patent, is—

1. As a new product of manufacture, the sulfonation product which can be obtained from a rhodamin imid and which in the form of its sodium salt possesses the following characteristics: It is soluble in water giving a bluish-red solution with a yellowish fluorescence; dilute solutions of it in water lose their color on addition of caustic soda, sodium carbonate or ammonia; it dyes animal fiber from a bath suitable for acid dyes, red shades; it is very fast against the action of light; it yields the corresponding basic rhodamin if subjected to long boiling in the presence of sulfuric acid containing twenty per cent. $H_2SO_4$; all substantially as described.

2. The process for the production of an acid dye of the rhodamin series which consists in treating a rhodamin imid with fuming sulfuric acid, substantially as described.

In testimony whereof I have hereunto set my hand in the presence of two subscribing witnesses.

HEINRICH AUGUST BERNTHSEN.

Witnesses:
GUSTAV L. LIETTENBERGER,
PAUL JULIUS.

It is hereby certified that in Letters Patent No. 646,794, granted April 3, 1900, upon the application of Heinrich August Bernthsen, of Mannheim, Germany, for an improvement in "Acid Rhodamin Dye and Process of Making Same," an error appears in the printed specification requiring correction, as follows: On page 1, the words "formed separates out in part. A further quan-" constituting line 64, as printed, should be stricken out and inserted as a line following line 66, same page; and that the said Letters Patent should be read with this correction therein that the same may conform to the record of the case in the Patent Office.

Signed, countersigned, and sealed this 19th day of June, A. D., 1900.

[SEAL.]

F. L. CAMPBELL,
*Assistant Secretary of the Interior.*

Countersigned:
 WALTER H. CHAMBERLIN,
  *Acting Commissioner of Patents.*